Figure 1:
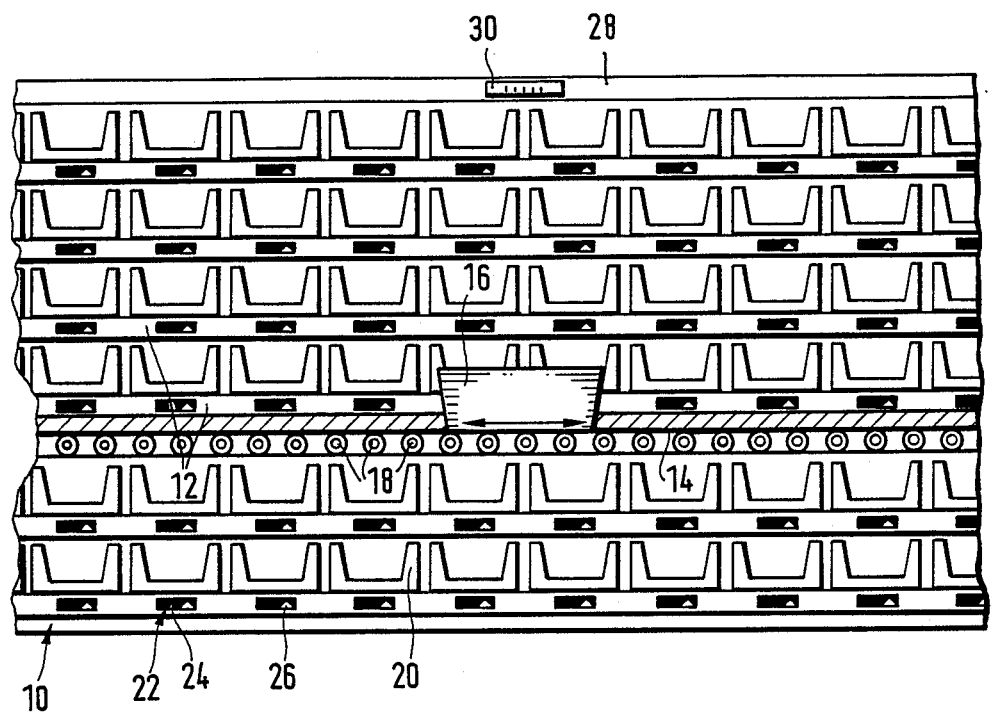

United States Patent [19]

Specht

[11] Patent Number: 4,711,045
[45] Date of Patent: Dec. 8, 1987

[54] APPARATUS FOR DOCUMENTLESS ORDER PICKING OF GOODS

[75] Inventor: Dieter Specht, Wermelskirchen, Fed. Rep. of Germany

[73] Assignee: Interroll Fordertechnik GmbH & Co. KG, Wermelskirchen, Fed. Rep. of Germany

[21] Appl. No.: 885,149

[22] Filed: Jul. 14, 1986

[30] Foreign Application Priority Data

Jul. 26, 1985 [DE] Fed. Rep. of Germany ....... 3526867

[51] Int. Cl.⁴ ............................................. H01R 33/00
[52] U.S. Cl. ........................................ 40/564; 40/573; 340/815.13; 340/815.14
[58] Field of Search ........................... 40/564, 573, 71; 340/815.2, 815.27, 815.12, 815.13, 815.14, 815.15

[56] References Cited

U.S. PATENT DOCUMENTS

| | | | |
|---|---|---|---|
| 2,961,631 | 11/1960 | Smith | 340/815.12 |
| 3,007,599 | 11/1961 | Greasley | 340/815.14 |
| 3,217,319 | 11/1965 | Raeger | 340/815.14 |
| 3,246,320 | 4/1966 | Houbolt | 340/815.14 |
| 3,508,043 | 4/1970 | Dellert | 340/815.13 |
| 3,719,941 | 3/1973 | Dickey | 340/815.14 |
| 3,761,920 | 9/1973 | Houbolt | 340/815.14 |
| 3,918,052 | 11/1975 | Bricher | 340/815.15 |
| 4,367,467 | 1/1983 | Emile | 340/815.2 |
| 4,473,870 | 9/1984 | Sorenson | 340/815.14 |

Primary Examiner—Henry E. Raduazo
Attorney, Agent, or Firm—Anthony J. Casella; Gerald E. Hespos

[57] ABSTRACT

The quantity display 22 of an apparatus for documentless order picking consists of a cover (36) which is preferably made from plastic and leaves a display panel (38) for a luminous display (24). Led through the cover (36) is an actuating button (50) for a switch which together with the digital luminous display (24) is secured on a printed board. The board and the actuating button 50 are secured via snap-action fit to the cover (36) and the cover (36) is mounted via snap-action fit on the storage means.

7 Claims, 4 Drawing Figures

APPARATUS FOR DOCUMENTLESS ORDER PICKING OF GOODS

The invention relates to an apparatus for documentless order picking comprising a storage means for the goods to be picked, a processing unit and connected to the processing unit electronic quantity displays in the region of each product, each quantity display having a switch and a digital luminous display.

Such apparatuses are finding increasing use in companies which must make up individual orders from a great number of products. For example, such apparatuses are used by pharmaceutical wholesalers. The advantage of this apparatus is that the person making up the orders need not use any paper because controlled via a computer each product from which a certain amount is ordered is displayed via the quantity display. After removal of the product from the corresponding supply container the operator only need actuate the switch in order to acknowledge that the product has been removed and deposited in the corresponding container in which the order is collected.

The quantity displays in conventional apparatuses consist of a great number individual parts of different materials which are assembled via screw connections. These quantity displays are expensive to make and complicated to assemble. Each of the known quantity displays is provided with its own decoder board and this considerably increases the production costs.

The invention is based on the problem of providing an apparatus for documentless order picking with such quantity displays, the quantity displays being inexpensive to manufacture and simple to assemble.

This problem is solved according to the invention in that the digital luminous display and the switch are arranged on a printed board, that the board is disposed via snap fit on a cover with a display face for the luminous display, that the actuating button for the switch is held by snap fit on the cover and that the cover together with the board and the actuating button is secured via snap fit to the storage means.

The quantity display in the apparatus according to the invention consists of a few single parts which are held via snap-action fit without screwing by very simple insertion in each other. The cover serves at the same time to secure the board with the luminous display and the switch as well as to guide and hold the actuating button for the switch and secure all the parts together to the storage means.

According to a preferred embodiment the cover consists of plastic and the display face is integrated in the cover, the cover preferably having at the surface a rough transparent structure and the display face being cut out of said structured surface so that the luminous digits can shine through from below and are easily legible According to a preferred embodiment at the lower side of the cover substantially perpendicularly projecting legs are disposed and at the inner and outer sides of the legs inclined extending noses with planar seat face are formed. The inner noses serve to hold the board with the luminous display and the switch and the outer noses serve to anchor the plugged-together quantity display to the corresponding location of a storage means. For assembly and installation of the quantity display the board with the luminous display and the switch is led from below between the legs and pressed upwardly until the noses on the seat face engage on the lower side of the board. After this the quantity display is inserted after wiring the board into a correspondingly formed recess for example on the frame of a storage rack until the noses disposed at the outside of the legs engage the edge of the recess.

In a further development of the invention the actuating button of the switch comprises a push face on the back of which legs with undercuttings and a stud for engaging the switch are formed and in the cover a passage hole for the legs and the studs is formed. The push face is inserted together with the legs and the stud into the passage hole in the cover until the undercuttings provided at the outer side of the legs engage behind the edge of the passage hole. The push face is then firmly but detachably locked to the cover.

If in further development of the invention the push face of the actuating button is formed as an equilateral triangle, by appropriate arrangement over this face and the resulting arrow effect it can be indicated for which section of the storage means the quantity display is intended. If the passage hole in the cover is made square one side of the equilateral triangle always extends parallel to an edge of the cover so that the apex opposite this parallel side of the triangle provides an indication whether the quantity display is associated with the region of the storage means lying thereabove, therebelow or a laterally disposed region.

In further development of the invention a plurality of quantity displays are connected to the processing unit via a wide band cable and the decoder boards of the apparatus are connected to the processing unit. Since in the apparatus according to the invention not every quantity display has its own decoder board and instead for example depending on the phases present in the wide band cable 10 quantity displays are coupled to a decoder board, the assembly costs can also be reduced due to the reduced material expenditure.

Figure 2:
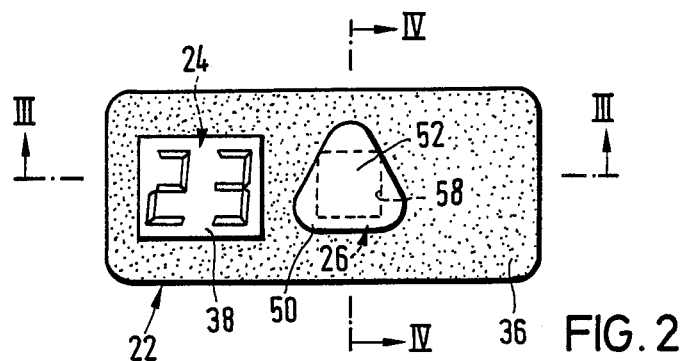
Figure 3:
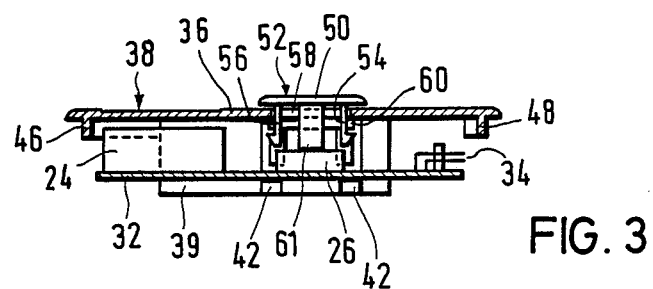
Figure 4:
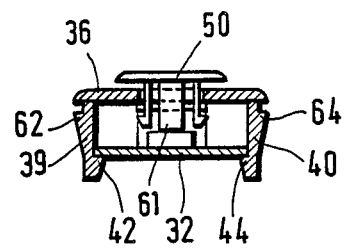

Examples of embodiment of the invention will be explained in detail with the aid of the drawings, wherein:

FIG. 1 shows in front elevation part of an apparatus for documentless order picking, FIG. 2 is a plan view of a quantity display with digital luminous display and acknowledgement key, FIG. 3 is a section along the line III—III of FIG. 2 and FIG. 4 is a section along the line IV—IV of FIG. 2.

FIG. 1 shows part of an apparatus for documentless order picking comprising a storing means 10 in the form of a rack with shelves 12 arranged above each other. In front of each rack a conveying path 14 is provided on which transport containers 16 are displaceable over rollers 18. On each of the shelves 12 product containers 20 are placed in which the products from which the orders are to be made up are stored. Beneath each container 20 on the front edge of the shelves 12 a quantity display 22 is disposed. Each quantity display 22 consists of a digital luminous display 24 and a switch 26 with which an acknowledgement is made when the product amount indicated by the luminous display 24 has been taken from a container 20 and transferred to the transport container 16. After actuation of the switch 26 the luminous display 24 is extinguished and in a processing unit connected to the quantity displays 22 it is registered that the items of the order have been selected and at the same time the products taken from the container 20 are deducted from the product amounts previously contained in the container 20 so that the products still contained in the storage means 10 can be called up at any time.

The quantity displays 22 are connected via a wide-band cable, not illustrated, to decoder boards which in turn are connected to the processing unit. Depending on the number of phases of the wide-band cable a greater or lesser number of quantity displays can be connectd to a decoder board. Conventional wide-band cables have twenty phases so that ten quantity displays can be connected to a decoder board. This makes it possible to greatly reduce the number of decoder boards because it is not necessary for each quantity display to have associated therewith its own decoder board.

On an upper shelf 28 a display 30 is provided which controlled via the processor unit indicates the number of the transport container 16 into which the products are to be transferred from the containers 20. When all the products have been dealt with, i.e. all the quantity displays have been set to zero via the acknowledgement key, the order has been made up and the transport container is conveyed to the dispensing station.

FIGS. 2 to 4 show to an enlarged scale a quantity display 22 having a digital luminous display 24 and a switch 26. As apparent in particular from FIG. 3 the digital luminous display 24 and the switch 26 are disposed on a board 32 with a printed circuit. The connection of the printed circuit disposed on the board 32 to a decoder board is via the terminals 34 which are coupled to a connector which is fitted to a wide-band cable, not shown.

The board 32 is disposed via snap fit at the lower side of a cover 36. The cover 36 has a surface of rough non-transparent structure. Only an area 38 over the digital luminous display 24 is made smooth so that the luminous figures below can shine through and are easily legible. At the lower side of the elongated rectangular cover 36 on the longitudinal sides legs 39 and 40 are formed which at their ends comprise noses 42 and 44 respectively with inclined run-on face so that the boards 32 can be inserted between the noses 42 and 44 until the planar faces of the noses engage beneath the board 32. At the lower side of the cover 36 on the narrow sides projecting edge portions 46, 48 are formed which serve to guide the cover 36 in a suitable recess at the storage means.

The switch 26 is actuated by an acuating button 50 held on the cover 36 via a snap fit. For this purpose the actuating button 50 comprises at the lower side of a push face 52 legs 54 and 56 which are provided with undercuttings which after pressing in through a passage opening 58 in the cover 36 engage behind projecting edges 60 of the passage opening 58 so that the actuating button 50 is held at the cover 36. For actuating the switch 26 at the rear side of the push face 52 a stud 61 is integrally formed which projects at the top of the switch 26 and on depression of the actuating button 50 actuates the switch 26.

The legs 39 and 40 comprise at the outside inclined noses 62, 64 with planar seat faces so that after introduction of the cover 36 with the board 32 disposed between the legs 39 and 40 into a recess at the storage means the noses 62 and 64 engage behind the edge of the recess formed thereon so that the entire quantity display 22 is held via snap fit on the storage means.

The push face 52 of the actuating button 50 is formed as an equilateral triangle. Since the passage opening 58 is square the pushbutton 50 can be arranged at the cover 36 in each case turned through 90°. This makes its possible to arrange one side edge of the push face 52 parallel to the upper or lower longitudinal side or the right or left narrow side of the cover. This results in an arrow action and the apex opposite the parallel side edge points in a direction in which the container 20 for which the quantity display is intended is arranged. The cover 36 and the actuating button 50 preferably consist of plastic and the display face 38 is formed integrally with the remaining structured face of the cover 36.

I claim:

1. An electronic display and switch apparatus to anable documentless order picking of goods from at least one storage location, said apparatus comprising:
    a board having a printed circuit thereon;
    a digital luminous display mounted to the board and electrically connected to at least a portion of the circuit thereon;
    a cover having a transparent display face and being disposed in snap fit mounting relationship to said board and covering at least the portion of the board to which the digital luminous display is mounted;
    a switch mounted to the board and in proximity to the digital luminous display;
    an actuator button mounted in snap fit relationship to the cover for limited movement relative thereto, said actuating button being disposed to selectively contact and actuate the switch;
    means for snap fitting the cover and the board to the storage location, whereby the digital luminous display may be operated to produce a signal relating to the goods to be picked and whereby the actuating button may be acutated to operate the switch and generate a signal.

2. Apparatus according to claim 1, characterized in that the cover consists of plastic and in that the display face is integral with cover.

3. Apparatus according to claim 2, characterized in that the cover has a non-transparent structure at the surface except for the display face.

4. Apparatus according to claim 1, characterized in that the cover comprises substantially perpendicular legs having at the respective inner and outer sides inclined extending noses and planar seat faces disposed to enable the respective snap fit engagements of said cover to said board and said storage location.

5. Apparatus according to claim 1, characterized in that the actuating button of the switch comprises a push face, that at the back of the push face legs with undercuttings and a stud are formed for engaging the switch and that in the cover a passage hole is formed for the legs and the stud.

6. Apparatus according to claim 5, characterized in that the push face of the actuating button is made in the form of an equilateral triangle.

7. Apparatus according to claim 1, characterized in that a plurality of electronic display and switch apparatuses are connected to the storage location.

* * * * *